(12) United States Patent
de Queiroz

(10) Patent No.: US 6,377,706 B1
(45) Date of Patent: *Apr. 23, 2002

(54) COMPRESSION FRAMEWORK INCORPORATING DECODING COMMANDS

(75) Inventor: Ricardo L. de Queiroz, Pittsford, NY (US)

(73) Assignee: Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/075,935

(22) Filed: May 12, 1998

(51) Int. Cl.⁷ ............................................. G06K 9/36
(52) U.S. Cl. ................................... 382/233; 382/253
(58) Field of Search ............................ 382/233, 253, 382/251, 248, 239

(56) References Cited

U.S. PATENT DOCUMENTS

| | | | | |
|---|---|---|---|---|
| 5,297,217 A | * | 3/1994 | Hamilton et al. | 382/296 |
| 5,751,865 A | * | 5/1998 | Micco et al. | 382/296 |
| 5,822,465 A | * | 10/1998 | Normicz et al. | 382/253 |
| 5,832,131 A | * | 11/1998 | Choo et al. | 382/253 |
| 5,838,823 A | * | 11/1998 | Ancessi | 382/232 |
| 5,867,112 A | * | 2/1999 | Kost | 341/51 |
| 5,892,847 A | * | 4/1999 | Johnson | 382/232 |
| 6,084,912 A | * | 7/2000 | Reitmeier et al. | 37/240 |

* cited by examiner

Primary Examiner—Yon J. Couso
(74) Attorney, Agent, or Firm—Oliff & Berridge, PLC

(57) ABSTRACT

An encoding and/or decoding method and apparatus incorporates decoding commands into a compressed file. The decoding commands are instructions carried along to a decompressor and implement processing performed in the compressed domain. Then, the decompressor performs some processing steps to the data while decompressing it. This reduces the computation time for the imaging operations.

40 Claims, 10 Drawing Sheets

BIT-DEPTH CONVERSION

RESIZING

| 11 | 12 | 13 |
|---|---|---|
| 14 | 15 | 16 |
| 17 | 18 | 19 |

ORIGINAL (a)

| 13' | 16' | 19' |
|---|---|---|
| 12' | 15' | 18' |
| 11' | 14' | 17' |

ROTATE 90°

| 21 | 22 | 23 |
|---|---|---|
| 24 | 25 | 26 |
| 27 | 28 | 29 |

ORIGINAL (a)

| 27' | 28' | 29' |
|---|---|---|
| 24' | 25' | 26' |
| 21' | 22' | 23' |

VERTICAL MIRROR (b)

FIG. 16

| 31 | 32 | 33 |
|---|---|---|
| 34 | 35 | 36 |
| 37 | 38 | 39 |

ORIGINAL (a)

| 31' | 34' | 37' |
|---|---|---|
| 32' | 35' | 38' |
| 33' | 36' | 39' |

TRANSPOSE (b)

FIG. 17

COMPRESSION FRAMEWORK INCORPORATING DECODING COMMANDS

BACKGROUND OF THE INVENTION

1. Field of Invention

This invention relates generally to processing compressed digital images. More particularly, this invention is directed to methods and apparatus for incorporating decoding commands into a compressed image data file to complement processing performed in the compressed domain to reduce computation time for imaging operations.

2. Description of Related Art

Data compression is required in data handling processes, where too much data is present for practical applications using the data. Commonly, compression is used in communication links to reduce the transmission time or required bandwidth. Similarly, compression is preferred in image storage systems, including digital printers and copiers, where "pages" of a document to be printed are stored temporarily in precollation memory. The amount of media space on which the image data is stored can be substantially reduced with compression. Generally speaking, scanned images, i.e., electronic representations of printed documents, are often large, and thus make desirable candidates for compression.

SUMMARY OF THE INVENTION

This invention is directed to reducing computation time for imaging operations that alter the appearance of the original image. In particular, this invention introduces decoding commands into a compressed image data file. These commands are instructions carried along to the decompressor and complement processing performed in the compressed domain. The commands, possibly along with original image parameters, instruct the decompressor to alter the appearance of the decoded image relative to the original image. Then, the decompressor performs some processing steps to the data while decompressing it. This results in reduced computation time for the image operations.

One aspect of this invention deals with a basic problem in the frequent use of compressed image buffers—the inability to process image data without performing expensive decompression and recompression operations. To make processing in the compressed domain more accessible, the compression format/methodology according to this invention preferably generates compressed data in such a way that a predetermined amount of data corresponds to a predetermined number of pixels in the image. If this condition holds, image regions in the compressed data can be easily identified, replaced or cropped. One preferred embodiment of this invention includes a method for compressing an image and a syntax for decoding commands that allows some image processing operations to be easily applied in the compressed domain.

A preferred embodiment of the system and method of this invention works particularly well for compression schemes such as vector quantization (VQ). In vector quantization, a group of pixels is quantized at the same time by representing the group as a code vector. The image data are first processed into sets of vectors. A codebook that best matches the data to be quantized is then generated. Each input vector is then quantized to the closest codeword. Compression is achieved by transmitting only the indices for the codewords. At the receiver, the images are reconstructed using a table look-up procedure.

In a preferred embodiment of the system and method of this invention, both the coder and the decoder share codebooks. In this embodiment, the codewords take the form of auxiliary data, and the compressed image data is generated based on the auxiliary data. The encoding indices of the auxiliary data are transmitted, and from these encoding indices, the decoder looks up a set of pixels. Thus, to process the compressed image, a decoding command can be incorporated into the compressed image data file. The decompressor that receives the decoding commands understands the commands and executes them over the codebook entries and/or the compressed image data. The auxiliary data is processed based on the decoding commands. The decoding of the compressed image data is based on the processed auxiliary data. The image is decompressed normally because the codebook entries are irrelevant for the decoding process, as long as the correspondence between the indices and the codebook entries is maintained.

Accordingly, the method and system of this invention can apply any number of operations to the compressed data, including TRC mapping, bit-depth conversion, resizing, rotation, mirroring, transposition, halftoning, cropping, pasting and merging. The system of this invention can include a data or image processing system able to compress and/or decompress an image. The method and system described herein are advantageous because they result in reduced computation time for imaging operations.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 1:
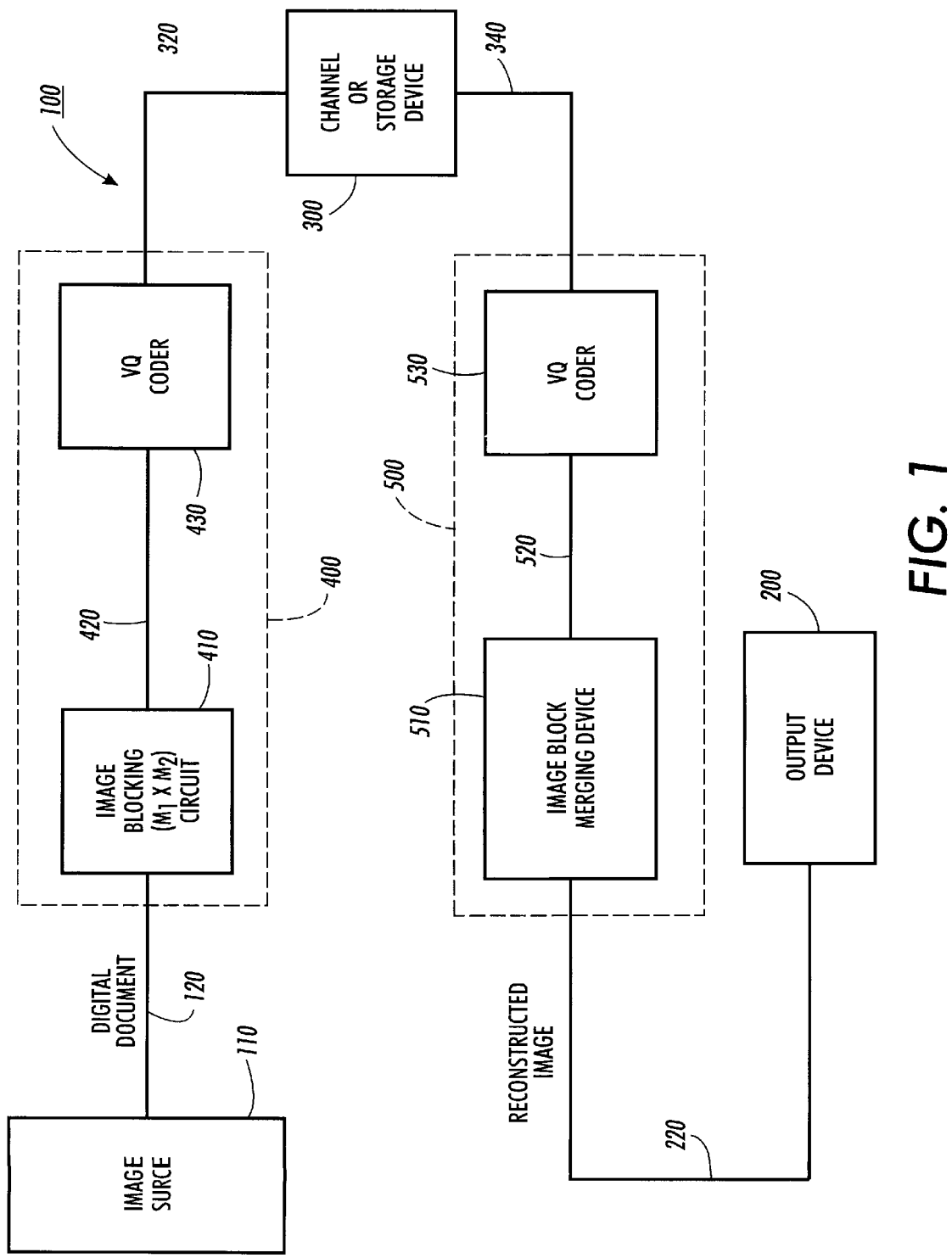
FIG. 1 is a generalized block diagram of an encoding and decoding system according to this invention.

FIG. 1 shows a generalized functional block diagram of an encoding and decoding system 100 according to this invention. The system 100 includes an image source 110 that may be any one of a number of different image sources, such as a scanner, a digital copier or a facsimile machine device, that are suitable for generating electronic image data, or a device suitable for storing and/or transmitting electronic image data, such as a client or server of a network. The electronic image data output from the image source 110 is provided to the encoder 400 via a signal line 120. The encoder 400, while preferably providing additional functionality, is capable of carrying out image processing and compression operations in accordance with this invention. It should be appreciated that, while FIG. 1 shows the encoder 400 as a VQ encoder, according to this invention any type of lossless or lossy image compression can be performed by the encoder 400. In such a case, the particular elements of the encoder 400 may be different than those shown in FIG. 1. Thus, this invention is not limited to VQ encoding, and specifically includes any known or later developed type of image encoding or compression.

In one preferred embodiment shown in FIG. 1, the encoder 400 includes an image blocking portion 410 that divides electronic image data into a plurality of $M_1 \times M_2$ blocks or segments. In one embodiment, the blocking operation may be accomplished by a windowing or cropping circuit that enables the transfer of data comprising one or more $M_1 \times M_2$ blocks of data from the input document to an $M_1 \times M_2$ data buffer in the encoder 400. Once stored in the data buffer, the $M_1 \times M_2$ blocks of image data are next sent via a signal line 420 to be operated on by a VQ coder 430. In the VQ coder 430, the data may be operated on using various compression operations associated with the vector quantization technique to compress the image data within a block.

Once compressed, each $M_1 \times M_2$ block of image data is then preferably transmitted to a channel or storage device 300 via a signal line 320. The channel or storage device 300 can be either or both of a channel device for transmitting the compressed image data to the decoder 500 or a storage device for indefinitely storing the compressed image data until there arises a need to decompress the compressed image data. The channel device can be any known structure or apparatus for transmitting the compressed image data from a first apparatus implementing the encoder 400 according to this invention to a physically remote decoder 500 according to this invention via a signal line 340. Thus, the channel device can be a public switched telephone network, a local or wide area network, an intranet, the Internet, a wireless transmission channel, or the like or any other distributed network.

Similarly, the storage device can be any known structure or apparatus for indefinitely storing compressed image data, such as RAM, a hard drive and disk, a floppy drive and disk, flash memory or the like. Moreover, the storage device can be physically remote from the encoder 400 and/or the decoder 500, and reachable over the channel device described above.

The output of the channel or storage device 300 is a coded or compressed unit of data to be decoded by the decoder 500. It should be appreciated that, similarly to the encoder 400 discussed above, while FIG. 1 shows the decoder 500 as a VQ decoder, according to this invention any type of lossless or lossy decompression can be performed by the decoder 500, so long as it matches the type of compression used to generate the compressed image data file to be decoded. In such a case, the particular elements of the decoder 500 may be different than those shown in FIG. 1. Thus, this invention is not limited to VQ decoding, and specifically includes any known or later developed type of image decoding or decompression.

In the preferred embodiment shown in FIG. 1, the decoder 500 includes a VQ decoder 530 that receives the compressed $M_1 \times M_2$ block of data from the channel or storage device 300 via the signal line 340 and an image processor 510 that receives the decoded image from the VQ decoder 530 via a signal line 520. Though the decoder 500 is shown in FIG. 1 as physically separate from the encoder 400, it should be understood that the decoder 500 and the encoder 400 may be different aspects of a single physical device.

The reconstructed image output from the image processor 510 of the decoder 500 can be transmitted to an output device 200 via a signal line 220. It should be understood that the output device 200 can be any device that is capable of outputting or storing an image processed in accordance with this invention.

Figure 2:
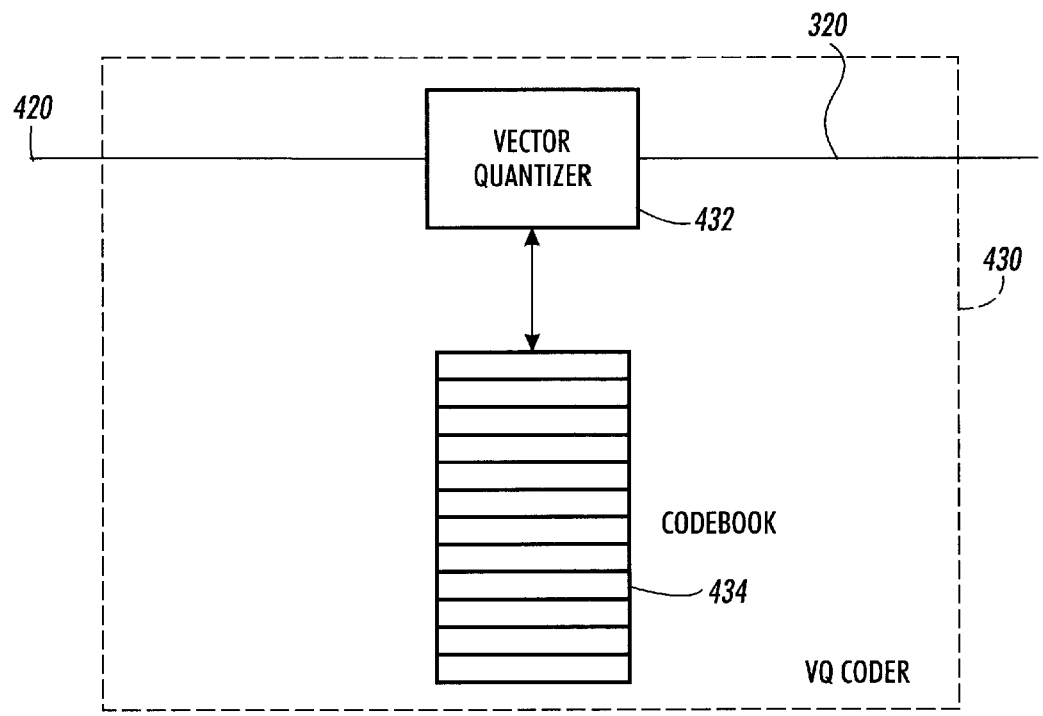
FIG. 2 shows a conventional VQ coder.

FIG. 2 shows conventional VQ coder. In the conventional VQ coder 430, an $M_1 \times M_2$ block of image data is input to the vector quantizer 432. In the vector quantizer 432, the input block of image data is compared to the entries stored in an encoding codebook 434. The entry in the codebook 434 closest to the input block is selected. The quantizer vector 432 thus outputs only the index of the codebook for the selected codeword entry for the input block of image data. This index, or codeword, can optionally be further encoded using entropy coding, such as, for example, arithmetic encoding, Huffman encoding, LZW encoding, and the like.

Figure 3:
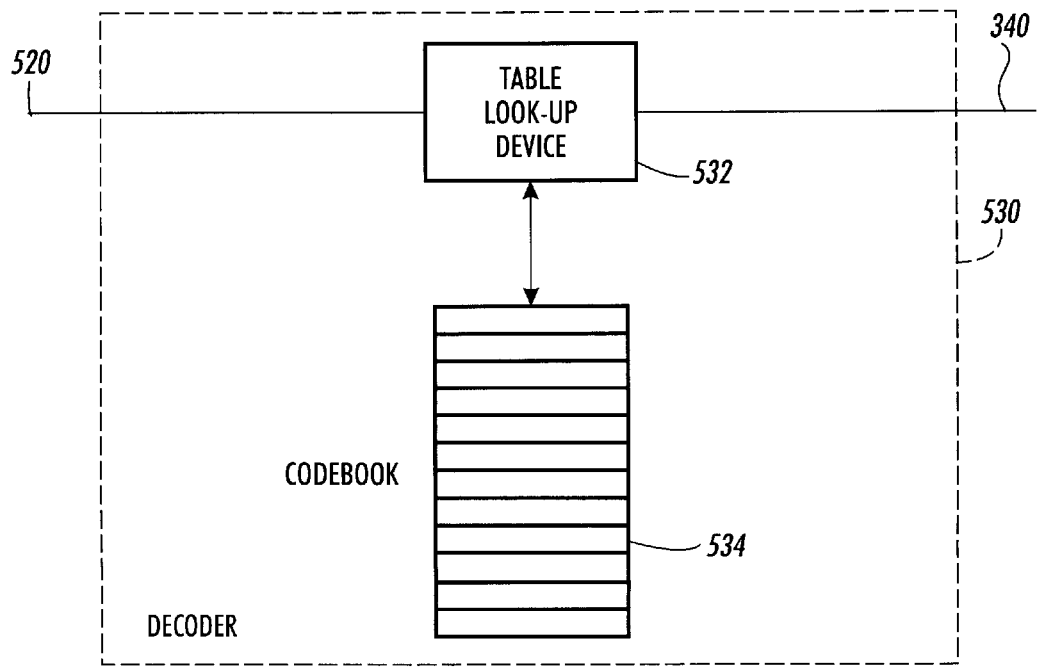
FIG. 3 shows a conventional VQ decoder.

FIG. 3 shows a conventional VQ decoder 530. In the conventional VQ decoder 530, the B-bit codewords are input to a table look-up device 532, where the index is input to a decoding codebook 534. The pixel pattern entry in the codebook 534 corresponding to the index is output from the table look-up device 532 as the decoded image block.

Figure 4:
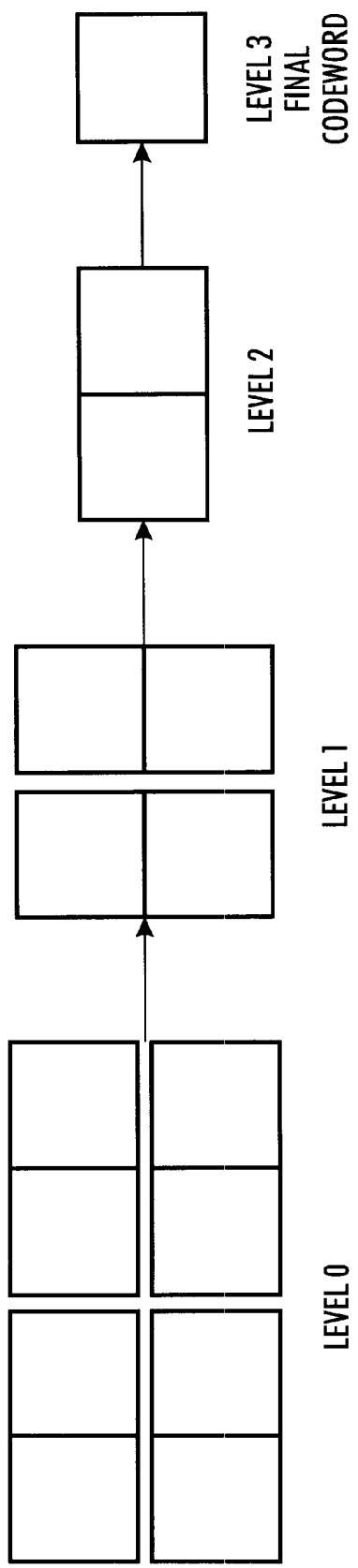
FIG. 4 shows an example of HVQ involving eight image pixels quantized into the final codeword.

An example of a practical VQ implementation is hierarchical VQ (HVQ). FIG. 4 shows an example of a HVQ implementation involving eight image pixels of a zero-th level (LEVEL 0) of an input image quantized into the final codeword. The eight image pixels of the zero-th level of the input image are passed through one state of vector quantization to form four first-level codewords (LEVEL 1) of an input image. The four codewords of the first-level of an input image are quantized into two new second-level codewords (LEVEL 2) of an input image. The two new codewords of the second level of an input image are, finally, quantized into a third-level codeword (LEVEL 3) of an input image. In this example, seven table look-ups are used. While the HVQ coder 430 needs to perform successive table look-ups, the HVQ decoder 530 does not need to follow the opposite path, since the final codeword fully specifies the $M_1 \times M_2$ block of the decoded image.

Figure 5:
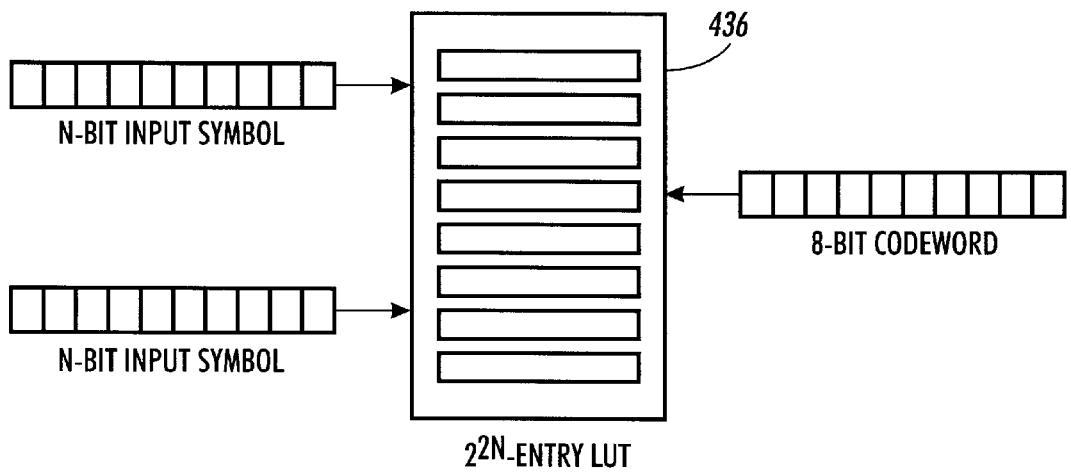
FIG. 5 shows an HVQ method of encoding two input symbols into a codeword.
Figure 6:
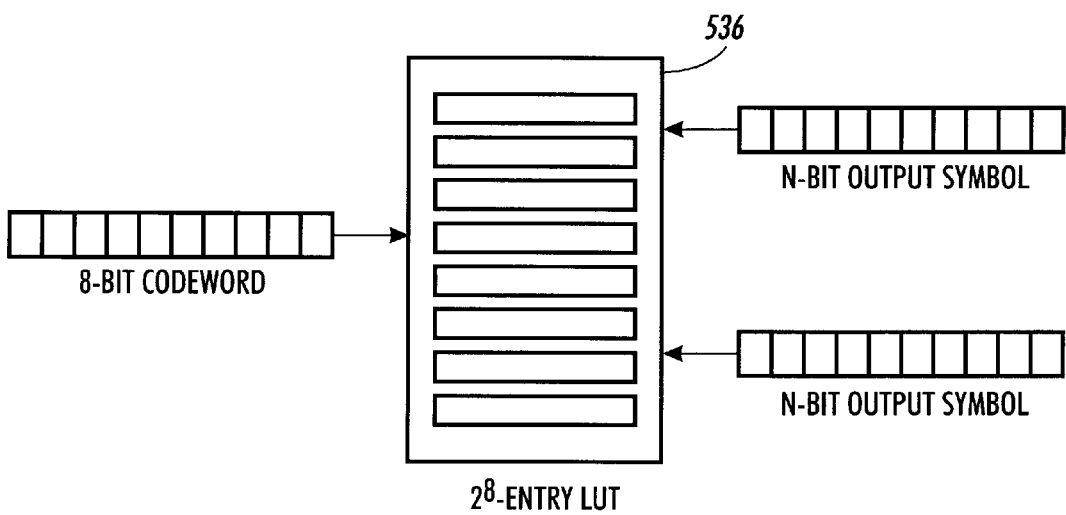
FIG. 6 shows an HVQ method of reconstructing input symbols based on a received codeword.

FIG. 5 shows an example of HVQ implementation in which, at each step, two symbols of N bits are encoded using a fixed B-bit codeword through a look-up table (LUT) 436. After the codeword is designated, the codeword is transmitted. As shown in FIG. 6, a decoder is able to reconstruct the two N-bit symbols based on the received codeword through a look-up table (LUT) 536.

In HVQ implementation, at each step, two symbols are combined into an output encoded symbol, reducing the number of symbols by a factor of two. At each step, the number of symbols is reduced. Thus, after S steps, the number of symbols is reduced, by a factor of $2^S$, to a single symbol. Compression is achieved since a reduced number of bits is actually transmitted. With a good design technique, the goal is to minimize the distortion incurred by the process. The advantage is the computational simplicity, since only stages of tables for conversion from 2N to 2B bits need to be provided.

Compression schemes such as hierarchical vector quantization are very fast for both encoding and decoding data. They are also very practical for the use of decoding commands, as embodied in an embodiment of this invention.

Figure 10:
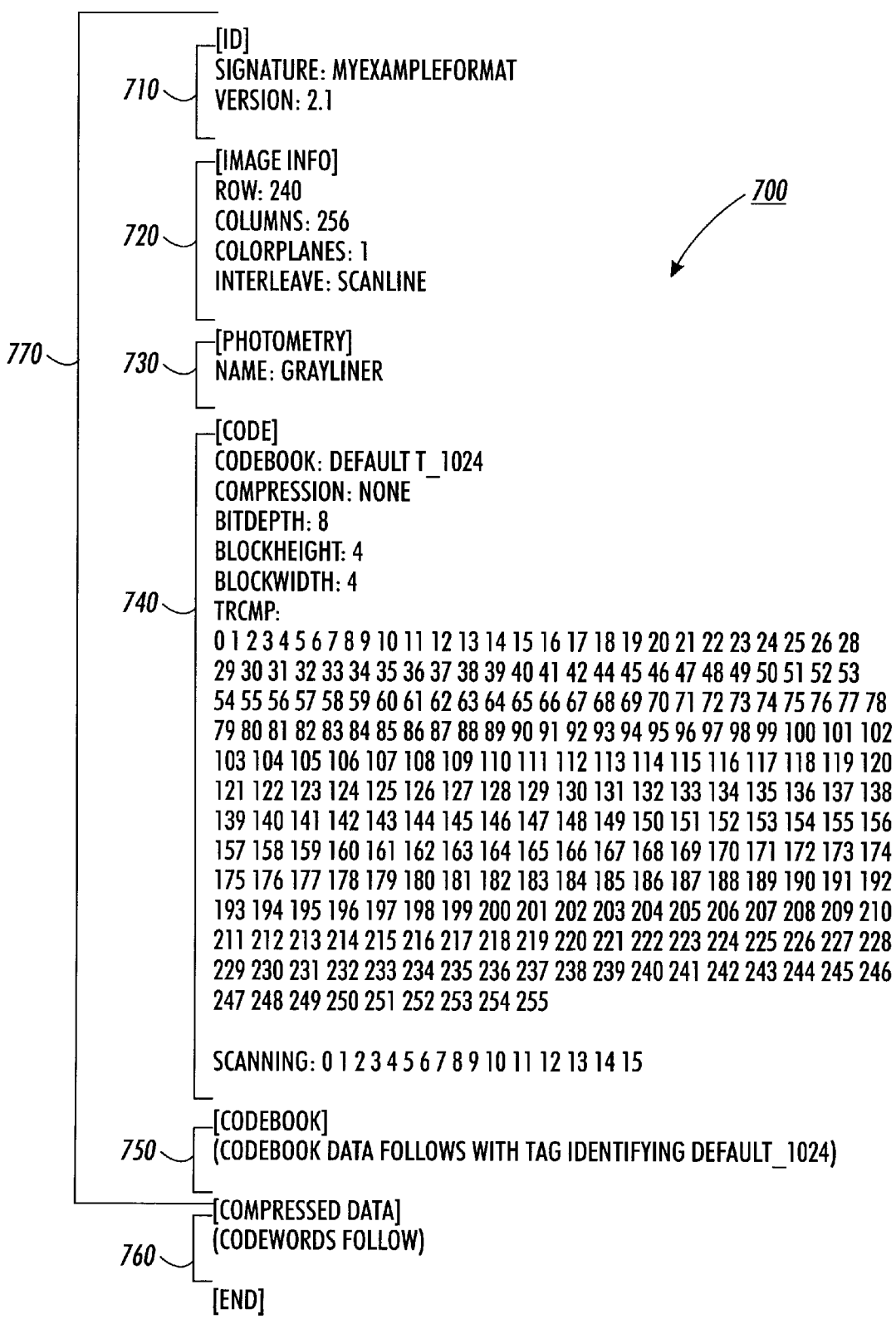
FIG. 10 shows a header in a codebook operation method according to this invention.
Figure 11:
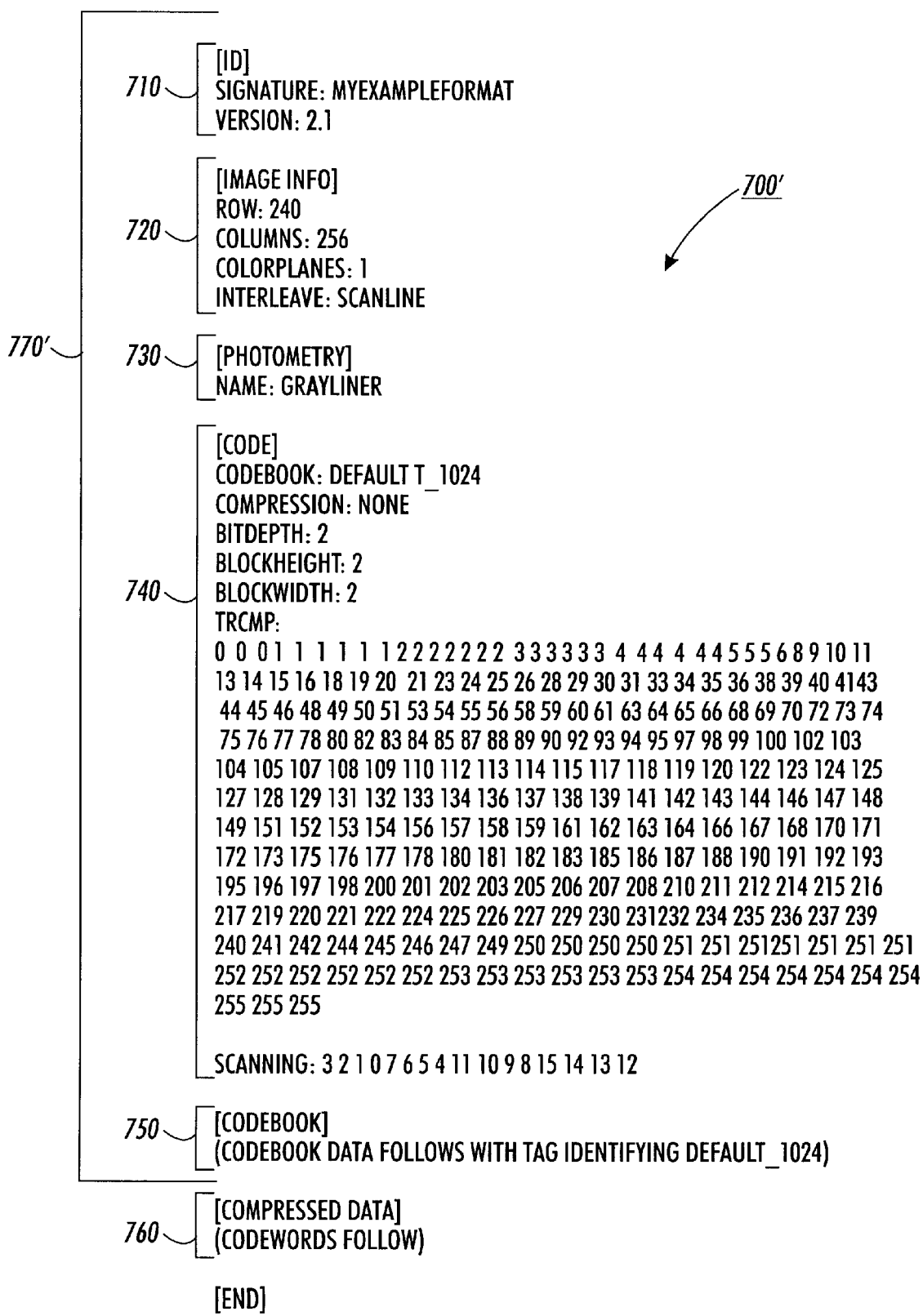
FIG. 11 shows a header in a codebook operation method using appended decoding commands according to this invention.

It should be understood that, in general, a conventional compressed image data file includes the compressed image data and additional information that provides the original image parameters. The decoder requires these original image parameters to structure the decompressed image data. That is, without this additional information, the decoder would be unable to determine how to structure the decoded image data to form an image. This additional information generally includes one or more of the image information and photometry sections 720 and 730 shown in FIGS. 10 and 11. This additional information is generally provided in a header 770 that is combined with the compressed image data 760 to form the compressed image data file 700, as shown in FIGS. 10 and 11.

It should be appreciated that the decoding commands according to this invention include any information such that, when the decoding commands are added to the compressed image data file, the decoding commands allow, in combination with the conventional additional information provided in the header to the compressed image data file, the output image formed from decompressing the compressed image data to be different from the original image from which the compressed image data was created. It should be further appreciated that the output image can differ from the original image in any way, including, but not limited to, orientation, size, scale, aspect ratio, bit depth, and any combination of these and other alterations that could be made to the original image.

It should even further be appreciated that the decoding commands can be added to the compressed image data file at any time between the time the compressed image data file is created by the encoder 400 and the compressed image data file is decoded by the decoder 500.

With the decoding commands according to this invention added to the header, the compressed data file specifies how the decompressed image data is to be interpreted and/or what functions are to be performed by or on the codebook entries of the decoding codebook 534 by the decoder 500. As the codebook 534 is often small compared to the image, operations on the codebook 534 are generally computationally inexpensive. Similarly, changing how the decompressed data is to be interpreted is also generally computationally inexpensive. Once the decoder 500 reads the input data file and identifies the decoding commands, the decoder 500 changes the fields of the input data file and decodes the compressed image data in accordance with the decoding commands by, for example, operating over the codebook. For every codebook entry, a block of $M_1 \times M_2$ pixels is processed.

Figure 7:
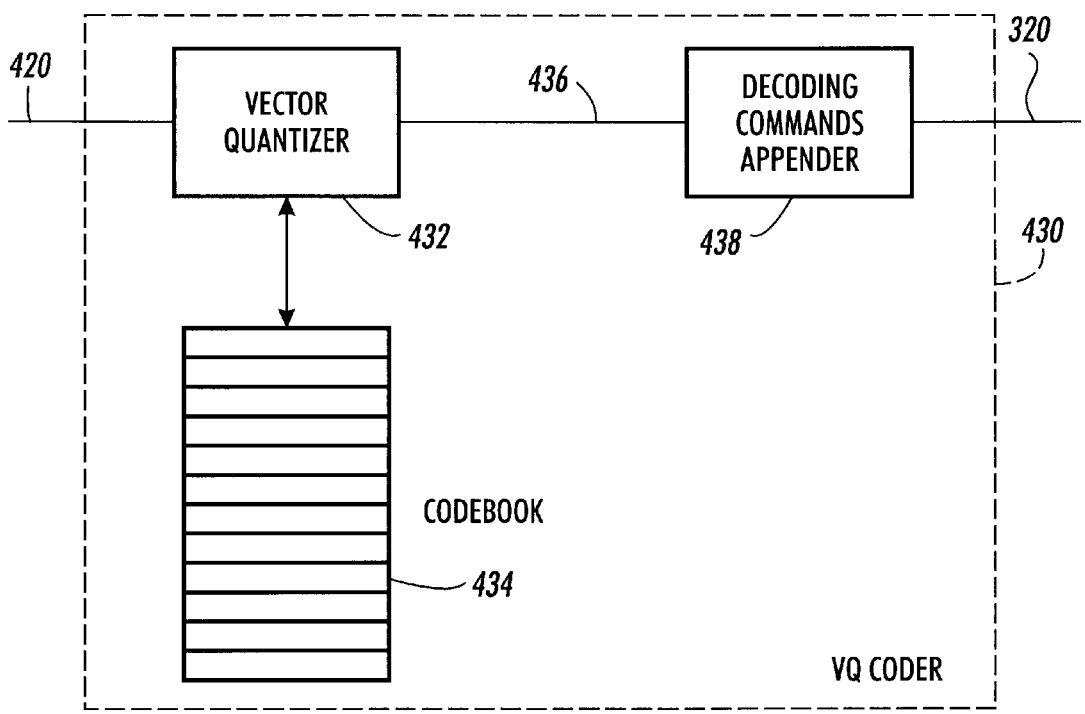
FIG. 7 shows a VQ coder according to this invention.

As shown in FIG. 7, in accordance with one embodiment of this invention, in the encoder 400, the codewords output by the vector quantizer 432 as auxiliary data are input to a decoding command appender 438 via line 436, where decoding commands are introduced and appended to, or more generally, incorporated into, the additional information added to the compressed image data to form the header of the compressed image data file.

In one preferred embodiment of this invention, the decoding commands appender adds or makes changes to a CODE portion 740 of the header 770, as shown in FIGS. 10 and 11. The code portion contains one or more data fields, such as a bit-depth field, a bit-width field, and the like.

The data for each of these fields is originally set based on the original image data and/or the original encoding scheme and codebook used to generate the indices. Thus, for example, for 8-bit byte map or continuous tone image data, the bit-depth field of the header is originally set to "8". Similarly, if the image data is encoded using a block width of 4 and a block height of 4, the block width and block height fields of the header are originally set to "4". Likewise, if a particular codebook is used to generated the indices, the codebook field is set to a label that either refers to a codebook that is explicitly set forth in the header or, if the codebook is already known to the decoder, identifies the codebook to be used to decode the compressed image data.

Then, by changing the values of one or more of the data fields in the CODE portion 740 of the header from the original values determined from the image data and/or the encoding scheme or codebook, the decoder, when decoding the compressed image data based on the changed values of the data fields in the CODE portion 740 of the header, modifies the codewords, and decodes the compressed image data based on the modified codewords the modified decompressed image.

Figure 8:
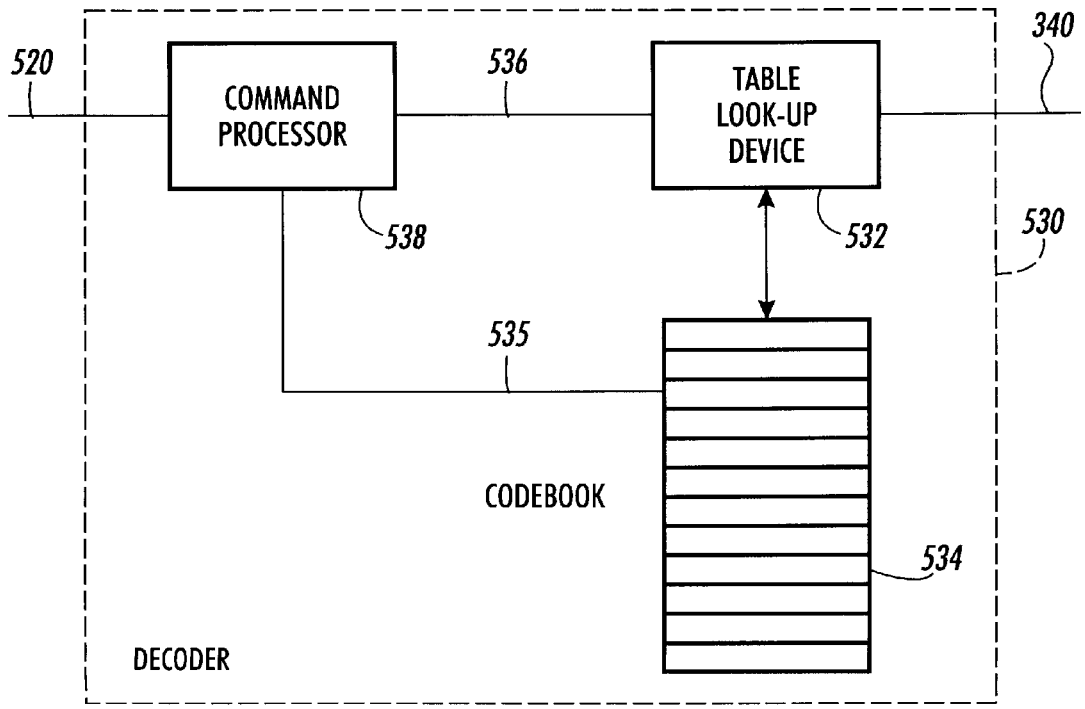
FIG. 8 shows a VQ decoder according to this invention.

As shown in FIG. 8, in accordance with this invention, in the decoder 500, the codebook indices and appended decoding commands are sent to the command processor 538, where the codewords are read and the decoding commands are identified. The fields changed in the header can include, for example, the bit-depth (BD), i.e., the desired amount of bits per pixel in the reconstructed image, the block-width (BW), i.e., the width in pixels of the reconstructed block, the block-height (BH), i.e., the height in pixels of the reconstructed block, and the like. The codewords are then processed based on the decoding commands. The output from the command and processor 538 is sent to the table look-up device 532 over a signal line 536. Then the table look-up device 532 proceeds to operate over the codebook 534. For example, new codebook data, either explicitly provided in the header, or identified by name in the header, is provided from the command processor 538 over a signal line 535 to the codebook 534, replacing the previously stored codebook data. The compressed image data is accordingly decoded based on the processed codewords.

It should be appreciated that, as set forth above, the decoding command appender 438 could be included in the VQ decoder 530, instead of or in addition to being provided in the VQ encoder 430. In this case, when the decoding command appender 438 is provided in the decoder 500, it inputs the received compressed image data file over the signal line 520. This received compressed image data file may or may not already have decoding commands appended to it. The decoding command appender 438 in the VQ decoder 530 inputs the received compressed image data file and adds decoding commands to, or changes the decoding commands already in the header of, the compressed image data file to obtain a desired output image that differs from the original image in a desired way. The revised compressed image data file is then output by the decoding commands appender 438 to the command processor 538, as described above. Similarly, the decoding commands could alternatively be appended at any time between being output by the encoder 400 and input by the decoder 500.

A decoding command set preferably includes instructions for scaling the block to fit a particular size, rearranging the block entries, and performing pixel-wise operations. Scaling the block to fit a particular size includes, for example, the operations of altering the bit-depth, altering the block-width, which was originally $M_1$ pixels, or altering the block-height, which was originally $M_2$ pixels. Rearranging the block entries can be accomplished by using a vector v with mn numbers. If the original blocks are arranged in the natural scan order, i.e., left-to-right or top-to-bottom into a vector x, rearranging the block entries results in the vector y. The mapping from x to y is controlled by:

$$y[k]=x[v[k]] \text{ for } k=1, \ldots, mn.$$

It should be appreciated that more complex commands, such as program code whose input is a block of entries for the decoding codebook, can be included in the appended decoded commands. For example, the commands can be given in JAVA™ code, or any other predetermined syntax.

Figure 9:
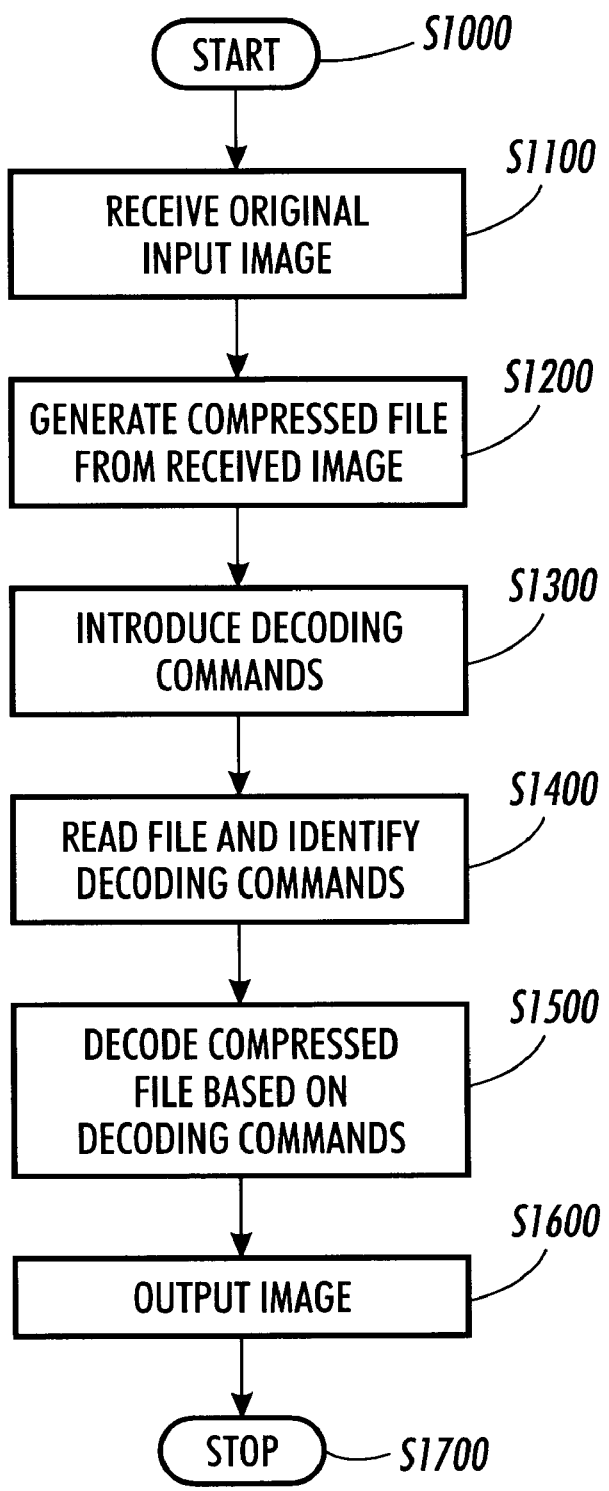
FIG. 9 is a flowchart outlining an image encoding, processing and decoding method according to this invention.

FIG. 9 is a flowchart outlining an image encoding, processing and developing method according to this invention. Beginning at step S1000, control continues to step S1100, where electronic image data for an original image is input. Then, in step S1200, compressed image data is generated from the electronic image data. Next, in step S1300, the decoding commands are introduced to the compressed image data. Control then continues to step S1400.

In step S1400, the data is read and the decoding commands are identified. Next, in step S1500, upon identification of the decoding commands, the decoder proceeds to decode the compressed image data based on the identified decoding commands. This step can include, for example, operating over the codebook. Then, in step S1600, a resulting image is output. Then in step S1700, the process stops.

FIGS. 10 and 11 show in greater detail how the codebook is operated on in step S1500. FIG. 10 shows an exemplary compressed image data file 700, including an exemplary header 770 and the compressed image data 760. The compressed image data file 700 was generated from a monochrome 960 pixels×1024 pixels original image, which was compressed using VQ encoding with blocks of 4 pixels×4 pixels so that each 4 pixels×4 pixels block is mapped to a codeword. In particular, while FIG. 10 illustrates the various decoding commands, these decoding commands do not result in any alterations to the decoded image compared to the original image.

The ID portion 710 of the header 700 identifies the format to the decoder 500. The IMAGEINFO portion 720 of the header 700, as discussed above, provides the original image parameters, as the additional information to the decoder 500. In particular, as shown in FIG. 10, the IMAGEINFO portion 710 indicates that original image is a 240×256 array of pixels and that there is only one color plane, i.e., that the image is monochrome. The PHOTOMETRY portion 730 of the header 700, as discussed above, provides the original photometry, or color space, to the decoder 500 to be used when decoding the compressed image data. As shown in FIG. 10, the original photometry, or color space, to be used by the decoder 500 is gray-linear photometry.

The CODE portion 740 of the header 700 provides the decoding commands that allows output image to be altered relative to the or original image. As discussed above, the CODE portion 740 includes fields such as the output codebook, the compression, the output bit-depth, the output block-height, the output block-width, the output TRC-mapping, and the output scanning order. By changing the values of these fields from the values used when compressing the image, the decoder 500 processes the sets of output pixels corresponding to the transmitted codewords or codeword indices to convert the output pixels to have altered values based on the altered ones of these fields. This will be explained in greater detail below with respect to FIG. 11.

In particular, as shown in FIG. 10, the CODE portion 740 indicates that the output image is to be decoded as blocks of 4 pixels×4 pixels with 8 bits per pixel, passing through a linear map in the natural scanning order. The codebook is set to a particular codebook label, "Default_1024". As described above, this label can refer either to a codebook explicitly defined in the codebook portion 750 of the header 770, or to a codebook that is known to be available to a generic decoder 500 or the specific decoder 500 that is going to be used to decode the compressed data 760. If the particular codebook as set is not present, a predetermined codebook is used. There is no compression of the codeword array.

The codebook portion 750 of the header 770, if not empty, sets forth the actual codebook entries, as shown in FIG. 10. The compressed data portion 760 of the compressed image data file 700 sets forth the actual codebook entry indices for the 61440 (240×256) blocks of encoded image data.

It should be appreciated that the codebook label provided in the CODE portion 740' can refer to a codebook that is different from the codebook used to compress the original image data. Moreover, while the codebook used to encode the original image data can use the same label as the codebook identified by the codebook label of the code portion 740, the two codebooks do not have to be the same. Thus, the codebook portion 750, while nominally having the same label as the codebook used to compress or encode the original image data, can explicitly define a codebook that is different from the codebook used to compress or encode the original image data. Similarly, even if the codebook label of the code portion 740 merely identifies a codebook already available to the decoder 500, that identified codebook can nonetheless be different from the codebook used to compress or encode the original image data.

FIG. 11 is an exemplary compressed image data file 700' that includes a header 770' that changes the appearance of the output image upon decoding the compressed data file. By changing some of the header fields in the CODE portion 740', the image data blocks are processed accordingly by the decoder 500 to provide an altered decoded image. In FIG. 11, the bit-depth field is changed from "8", as shown in FIG. 10, to "2", the bit-height field is changed from "4", as shown in FIG. 10, to "2", and, the bit-width field is changed from "4", as shown in FIG. 10, to "2". Thus, compared to the values for these fields used when generating the codewords in the VQ coder 400, these values result in an output image that has one-half (2/4) the width, or horizontal extent, of the input image, one half (2/4) the height, or vertical extent, of the input image, and one-quarter (2/8) the bit-depth, or greyscale levels, of the input image.

In FIG. 11, the TRC-mapping field and the scanning order field are also altered compared to FIG. 10. In particular, in the CODE portion 740' shown in FIG. 11, the TRC field alterations change the greyscale values of the decoded pixels from the initial greyscale values shown in FIG. 10. In FIG. 10, each greyscale value of the output image corresponds to the position, starting from "0", of that value in the list shown in the TRC field. In FIG. 11, the positions below 128 have values moved towards zero from their positional value. In contrast, the positions above 127 have their values moved towards 256 from their positional values. The effect of these value shifts is to increase the contrast between the lighter and darker pixels.

In addition, in the CODE portion 740' shown in FIG. 11, the scanning field alterations change the placement of the blocks according to their position in the scan line from the input order, represented by the scanning field shown in FIG. 10, to the output order, defined by the scanning field shown in FIG. 11.

It should be appreciated that other fields may be changed, and that although all of the bit-depth, bit-height, bit-width, TRC-mapping and scanning fields are shown as being changed in FIG. 11, each can be changed independently.

Additional decoding commands can also be added to the headers 770 and 770' shown in FIGS. 10 and 11. These additional decoding commands can be in addition to, or in place of, the decoding commands of the CODE portion 740 and/or the changes made to the codebook portion 750.

These additional decoding commands are used to change the original image parameters. These changes to the original image parameters are implemented by adding decoded image parameters to the IMAGEINFO portion 720 and/or the Photometry portion 730, rather than changing the image parameters initially set forth in the IMAGEINFO and Photometry portions 720 and 730. That is, to use these additional decoding commands, the command processor 538 must have both the original image parameters and desired image parameter decoding commands for the desired output image. The command processor 538 uses the original and desired image parameter decoding commands, to determine how the compressed image data in the compressed data portion 760 is to be decompressed so that the decompressed image data has the desired image parameters.

Figure 12:
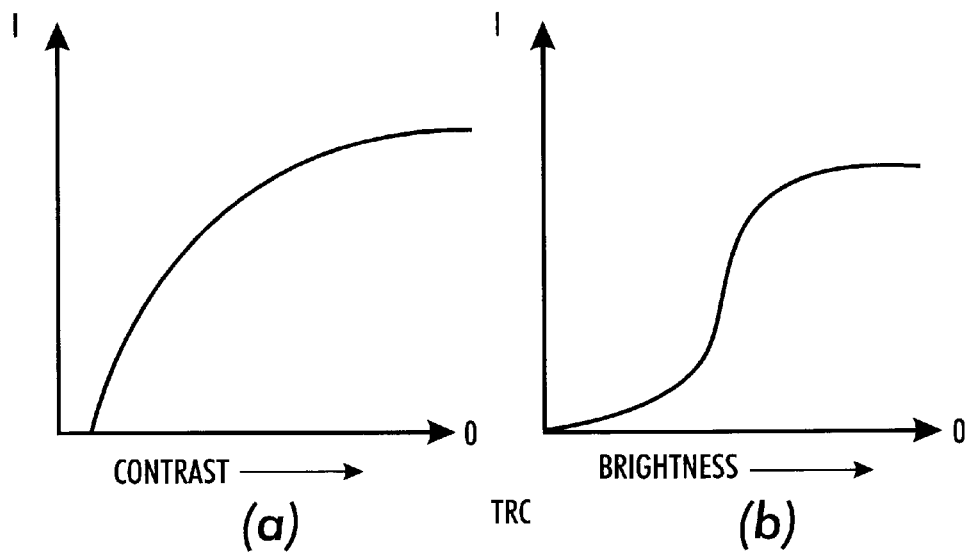
FIGS. 12(*a*), 12(*b*), 13(*a*), 13(*b*), 14(*a–c*), 15(*a*), 15(*b*), 16(*a*), 16(*b*), 17(*a*) and 17(*b*), illustrate examples of the processing operations that can be performed using appended decoding commands according to this invention.

FIGS. 12–17 show examples of processing operations that can be performed using the appended decoding commands according to this invention. FIG. 12 shows a tone-reproduction curve (TRC) as a pixel-wise operation. In this operation, every input pixel value is mapped to another pixel value on the curve. In portion (a) of FIG. 12, the contrast of the output image is decreased relative to the input image. In portion (b) of FIG. 12, the brightness of the output image is increased. To enhance contrast or brightness of an image using the example header of FIGS. 10–11, TRC pixel-wise operation is performed by changing the TRC-mapping field in the CODE portion 740 of the header 770' shown in FIG. 10, for example, to the TRC-mapping field in the CODE portion 740' of the header 770' shown in FIG. 11. Accordingly, the decoder maps the blocks based on the new pixel values.

Figure 13:
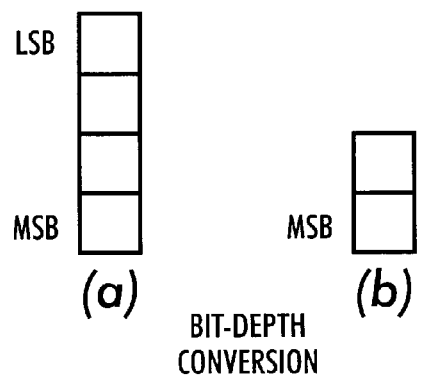

FIG. 13 shows a bit-depth conversion operation to change the bit-depth from 4 bits/pixel to 2 bits/pixel. The bit-depth, i.e., the number of bits per pixel, can be changed by simply changing the bit-depth field of the header. Accordingly, to process the output image, in each output pixel, only the indicated number of most-significant greyscale value bits are retained. This operation is useful for devices such as scanners and cameras, which use a bit-depth of a given number of bits, but will be displayed or printed using a device having a bit-depth of a different number of bits. In such operations, the decoding command is used to change the bit-depth in the instructions. In FIG. 11, in the header 770', the decoding command is used to change bit-depth value from "8"to "2".

Figure 14:
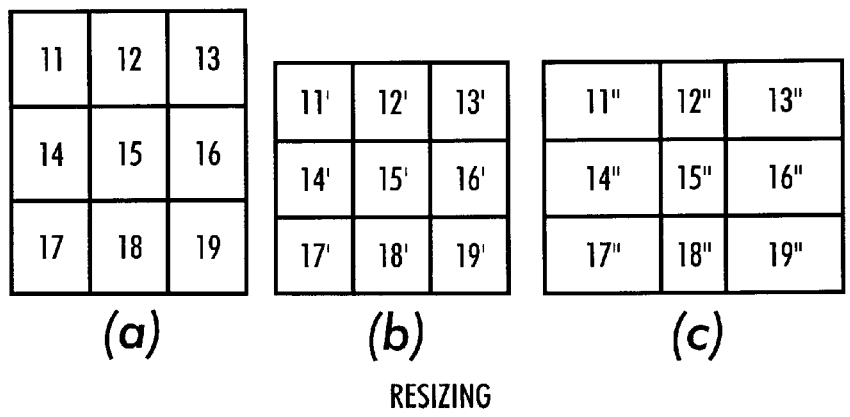

FIG. 14 shows a resizing operation. This operation is done by spatial scaling to enlarge or reduce the size of the blocks. The decoder 500 will try to approximate the requested size by possibly using blocks of spatially varying size if possible. According to an embodiment of the invention, the codebook entries, rather than the image data, are resized. This is done by modifying using decoding commands and using non-integer numbers for the bit-height and bit-width values. For example, if blocks 11–19 shown in portion (a) of FIG. 14 are to be resized by two-thirds, the decoder will try to approximate it by scaling the codebook entries uniformly to output decoded image block that fit into blocks 11'–19', as shown in portion (b) of FIG. 14. If the decoder cannot approximate the blocks uniformly, it will try to scale the codebook entries into blocks 11"–19" as shown in portion (c) to obtain a resizing of two-thirds. FIG. 11 shows a header in which the decoding command is used to change bit-height and bit-width values from "4" to "2". This effectively cuts the size of the image in half in each direction, or one-quarter the original area.

FIG. 15 shows a rotation of original image by 90° having pixels 11–19. After the rotation, the original image shown in portion (a) of FIG. 15 is transformed into the image having pixels 11'–19', shown in portion (b) of FIG. 15. This operation is done by rotating the codewords using any fast algorithm. The decoding command is used to modify a defined rearrangement order of the blocks, to reflect an intrablock or interblock rotation. This operation is also performed on the mirroring and transposition operations shown in FIG. 16 and FIG. 17 to form transformed pixels 21–29 and 31–39, respectively. The header 770' of FIG. 11 changes the order of the pixels by changing the scanning field, compared to the header 770' shown in FIG. 10. At reconstruction, the decoder 500 maps the codebook block to the actual output image block according to the scanning order defined on the scanning field of the code portion 740.

As shown in FIG. 1, the encoder 400 is preferably implemented on a programmed general purpose computer. However, the encoder 400 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as PLD, PLA, FPGA or PAL, or the like. In general, any device, capable of implementing a finite state machine that is in turn capable of implementing steps S1100–S1300 of the flowchart shown in FIG. 9, can be used to implement the encoder 400.

As shown in FIG. 1, the decoder 500 is preferably implemented on a programmed general purpose computer. However, the decoder 500 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing steps S1300–S1500 of the flowchart shown in FIG. 9 and/or the operations shown in FIGS. 12–17, can be used to implement the decoder 500.

While one preferred embodiment compresses a compressed image data file having an appended header containing the decoding commands, any known or later developed method for incorporating the decoding commands into the compressed image data file is within the scope of this invention. That is, this invention is not limited to the specific methods disclosed herein for incorporating the decoding commands into the compressed image data file, but more generally encompasses a compressed image data file that includes decoding commands, regardless of the method for incorporating the decoding commands into the compressed image data file.

This invention has been described in connection with the preferred embodiments. However it should be understood that there is no intent to limit the invention to the embodiments described above. On the contrary, the intent to cover all alternatives, modification, and equivalents as may be included within the spirit and scope of the invention as defined by the pending claims.

What is claimed is:

1. A method for processing compressed image data, comprising:

receiving electronic image data representing an original image;

generating a compressed image data file from the received electronic image data that includes first information for decompressing the original image, wherein codebook data is selected for the image data;

incorporating second information into the image data file after compression, the second information comprising instructions which update previously stored codeword data and alter an appearance of a decoded image relative to the original image;

identifying the second information; and decoding compressed image data contained in the compressed image data file according to the first information and the identified second information to update previously stored codeword data and form processed electronic image data of the decoded image, the decoded image representing an altered version of the original image processed.

2. The method of claim 1, wherein:

the compressed data file includes the compressed image data and a header of additional information providing original image parameters; and incorporating the decoding commands comprises at least one of adding information and changing information in the header.

3. The method of claim 2, wherein the header comprises at least one of an identification portion, an image information portion, a photometry portion, a code portion and a codebook definition portion.

4. The method of claim 3, wherein the code portion comprises at least one of a codebook field, a compression field, a bit-depth field, a bit-height field, a bit-width field, a TRC-mapping field, and a scanning field.

5. The method of claim 1, wherein the compressed image data is generated based on auxiliary data.

6. The method of claim 5, further comprises processing the auxiliary data based on the decoding commands, wherein decoding the compressed image data is based on the processed auxiliary data.

7. The method of claim 1, wherein decoding the compressed image data comprises examining a header of the compressed image data file, the header containing the decoding commands.

8. The method of claim 7, wherein the header comprises at least one of an identification portion, an image information portion, a photometry portion, a code portion and a codebook definition portion.

9. The method of claim 1, wherein generating the compressed image data comprises vector quantization.

10. The method of claim 1, wherein decoding the compressed image data is based on a look-up table.

11. A system for processing compressed image data, comprising:

an image source that outputs electronic image data representing an original image;

a coder that inputs the electronic image data, comprising:

a compressor that selects codebook data for the image data and generates a compressed image data file from the electronic image data that includes first information for decompressing the original image, and an appender that incorporates second information into the image data file after compression, the commands comprising instructions which update previously stored codeword data and alter an appearance of a decoded image relative to the original image;

a decoder that decodes the compressed image data to form decoded image data, comprising:

a command processor that processes the second information, and a decoding device;

wherein the decoder decodes compressed image data contained in the compressed image data file based on the first information and the second information to update previously stored codeword data and form a reconstructed image, the reconstructed image representing an altered version of the original image.

12. The system of claim 11, wherein:

the compressed data file includes the compressed image data and a header of additional information providing original image parameters, and the appender comprises a generator that at least one of adds information to and changes information in the header.

13. The system of claim 12, wherein the header comprises at least one of an identification portion, an image information portion, a photometry portion, a code portion and a codebook definition portion.

14. The system of claim 13, wherein the code portion comprises at least one of a codebook field, a compression field, a bit-depth field, a bit-height field, a bit-width field, a TRC-mapping field, and a scanning field.

15. The system of claim 11, wherein the compressor generates the compressed image data based on an auxiliary data.

16. The system of claim 15, further comprising a processor that processes the auxiliary data based on the decoding commands, wherein the decoder decodes the compressed image data based on the processed auxiliary data.

17. The system of claim 11, wherein the coder is a vector quantization coder.

18. The system of claim 11, wherein the decoding device is a table look-up device.

19. The system of claim 11, wherein the decoding device comprises a command processor that examines a header appended to the compressed image data file, the header containing the decoding commands.

20. The system of claim 19, wherein the header comprises at least one of an identification portion, an image information portion, a photometry portion, a code portion and a codebook definition portion.

21. A method for encoding compressed image data, comprising:

receiving electronic image data representing an original image;

generating a compressed image data file from the received electronic image data that includes first information for decompressing the original image, wherein codebook data is selected for the image data; and incorporating second information into the compressed image data file after compression, the second information comprising instructions which update previously stored codeword data and alter an appearance of a decoded image relative to the original image.

22. The method of claim 21, wherein:

the compressed data file includes compressed image data and a header of additional information providing original image parameters, and incorporating the decoding commands comprises at least one of adding information to and changing information in the header.

23. The method of claim 22, wherein the header comprises at least one of an identification portion, an image information portion, a photometry portion, a code portion and a codebook definition portion.

24. The method of claim 23, wherein the code portion comprises at least one of a codebook field, a compression field, a bit-depth field, a bit-height field, a bit-width field, a TRC-mapping field, and a scanning field.

25. The method of claim 22, wherein generating the compressed image data comprises vector quantization.

26. An apparatus for encoding compressed image data, comprising:

a compressor that generates compressed image data file from the electronic image data that includes first information for decompressing the original image, wherein codebook data is selected for the image data; and an appender that incorporates second information into the compressed image data file, the second information comprising instructions which update previously stored codeword data and alter an appearance of a decoded image relative to the original image.

27. The system of claim 26, wherein:

the compressed data file includes compressed image data and a header of additional information providing original image parameters, and the appender comprises a generator that at least one of adds information to and changes information in the header.

28. The system of claim 27, wherein the header comprises at least one of an identification portion, an image information portion, a photometry portion, a code portion and a codebook definition portion.

29. The system of claim 28, wherein the code portion comprises at least one of a codebook field, a compression field, a bit-depth field, a bit-height field, a bit-width field, a TRC-mapping field, and a scanning field.

30. The apparatus of claim 26, wherein the compressor comprises a vector quantization coder.

31. A method for decoding a compressed image data file representative of an original image, the compressed image data file including first information for decompressing the original image and second information incorporated into the image data file after compression that provide instructions that update previously stored codeword data and alter an appearance of a decoded image relative to the original image, the method comprising:

identifying the second information; and decoding the compressed image data representative of the original image according to the first information and the second information to update previously stored codeword data and form processed electronic image data of the decoded image, the decoded image representing an altered version of the original image.

32. The method of claim 31, further comprising processing auxiliary data based on the decoding commands, wherein decoding the compressed image data is based on the processed auxiliary data.

33. The method of claim 32, wherein decoding the compressed image data is based on a look-up table.

34. The method of claim 31, wherein decoding the compressed image data comprises examining a header of the compressed image data file, the header containing the decoding commands.

35. The method of claim 34, wherein the header comprises at least one of an identification portion, an image information portion, a photometry portion, a code portion and a codebook definition portion.

36. An apparatus for decoding a compressed image data file representative of an original image, the compressed image data file including first information for decompressing the original image and second information incorporated into the image data file after compression, the second information comprising instructions which update previously stored codeword data and alter an appearance of a decoded image relative to the original image, the apparatus comprising:

a command processor that processes the second information; and a decoding device;

wherein the apparatus decodes the compressed image data representative of the original image based on the first information and the second information to update previously stored codeword data and form a reconstructed image, the reconstructed image representing an altered version of the original image processed.

37. The apparatus of claim 36, further comprises a processor that processes the auxiliary data based on the decoding commands, wherein the decoding device decodes the compressed image data based on the processed auxiliary data.

38. The apparatus of claim 36, wherein the decoding device is a table look-up device.

39. The system of claim 36, wherein the decoding device comprises an command processor that examines a header of the compressed image data file, the header containing the decoding commands.

40. The system of claim 39, wherein the header comprises at least one of an identification portion, an image information portion, a photometry portion, a code portion and a codebook definition portion.

* * * * *